United States Patent [19]

Shangguan et al.

[11] Patent Number: 5,429,689
[45] Date of Patent: Jul. 4, 1995

[54] LEAD-FREE SOLDER ALLOYS

[75] Inventors: Dongkai Shangguan, Novi; Achyuta Achari, Canton, both of Mich.

[73] Assignee: Ford Motor Company, Dearborn, Mich.

[21] Appl. No.: 299,230

[22] Filed: Aug. 31, 1994

Related U.S. Application Data

[63] Continuation of Ser. No. 124,655, Sep. 7, 1993, abandoned.

[51] Int. Cl.$^6$ .............................................. C22C 13/02
[52] U.S. Cl. .................................. 148/400; 148/405; 420/562; 420/590
[58] Field of Search ............... 420/559, 561, 562, 590; 148/400, 405

[56] References Cited

U.S. PATENT DOCUMENTS

| | | | |
|---|---|---|---|
| 549,610 | 11/1895 | Ramage | 420/557 |
| 3,157,473 | 11/1964 | Acton | 29/183.5 |
| 3,503,721 | 3/1970 | Lupfer | 29/195 |
| 3,607,253 | 9/1971 | Cain et al. | 75/175 A |
| 4,106,930 | 8/1978 | Nomaki et al. | 420/558 |
| 4,797,328 | 1/1989 | Boehm et al. | 428/621 |
| 4,806,309 | 2/1989 | Tulman | 420/561 |
| 5,066,544 | 11/1991 | Betrabet et al. | 420/558 |
| 5,256,370 | 10/1993 | Slattery et al. | 420/557 |
| 5,328,660 | 7/1994 | Gonya et al. | 420/562 |

OTHER PUBLICATIONS

Mei, et al, "Effects of Cooling Rate on Mechanical Properties of Near-Eutectic Tin-Lead Solder Joints," *Journal of Electronic Materials*, vol. 20, No. 8, 1991, pp. 599–608.

*Primary Examiner*—David A. Simmons
*Assistant Examiner*—Sean Vincent
*Attorney, Agent, or Firm*—Roger L. May; Joseph W. Malleck

[57] ABSTRACT

A non-toxic alloy for soldering electronic components comprising 80% Sn, 5–14.5% In, 4.5–14.5% Bi and 0.5% Ag. The disclosed alloy has a fine microstructure. Particles of intermetallic compounds are finely dispersed throughout the matrix, thereby inhibiting grain growth. Accordingly, the alloy does not significantly coarsen after thermal aging.

17 Claims, No Drawings

LEAD-FREE SOLDER ALLOYS

This is a continuation of application Ser. No. 08/124,655 filed on Sep. 7, 1993, now abandoned.

BACKGROUND OF THE INVENTION

1. Technical Field

The present invention relates to a non-toxic, lead-free solder alloy.

2. Related Art Statement

For many years, solder compositions which have been in frequent use include the metallic elements tin (Sn) and lead (Pb). Such alloys have been found to provide acceptable results in most environments. However, increased awareness of and concerns about problems of toxicity have resulted in lead no longer being an ingredient of choice.

It is anticipated that the federal government will regulate the use of lead in electronics packaging in the near future. The regulation may take one of the following possible scenarios: (1) increase taxes on Pb products, (2) classify Pb-containing products as hazardous materials and therefore require special handling and recycling efforts; and (3) ban the use of Pb in electronics packaging products.

In response to this situation, industries in U.S., Europe, and Japan are making efforts to find alternatives to Pb-bearing solders. Work is needed to develop, identify, acquire and evaluate Pb-free solders for use in automotive electronics products. In the electronics industry, for example, the solder interconnect is a critical part of electronics packaging, in which there are many applications requiring solder alloys that exhibit a high creep/fatigue strength, especially where soldered parts are subjected to mechanical stress over extended periods. Efforts which have been made include the development of Pb-free solder alloys, and product evaluation for applications in hybrid (thick film) products as well as printed wiring boards (PWB).

Consequently, there has developed an interest in finding a satisfactory way to eliminate lead from solder compositions and substitute other elements to yield equivalent or enhanced properties. In the automotive electronics field, a need has arisen to replace the currently used Pb-Sn base solders. Other toxic elements, such as Sb, Cd, etc., should also be minimized or excluded from consideration.

Most lead-free solder alloys are alloys which either contain other toxic constituents or have various other drawbacks and are therefore unsuitable for automotive electronics packaging applications. Representative of references which disclose such alloys are U.S. Pat. Nos. 4,806,309; 1,565,115; 4,797,328; 3,607,253; 3,157,473; and 3,503,721. Table A summarizes and compares the ingredients of compositions disclosed in these references, together with their melting temperature:

TABLE A

| U.S. Pat. No. | Sn [Wt %] | In [Wt %] | Bi [Wt %] | Ag [Wt %] | Other [Wt %] | Melting Temperature [°C.] |
|---|---|---|---|---|---|---|
| #1 4,806,309 | 90–95 | — | 1–4.5 | 0.1–0.5 | 3–5 Sb | 218–235 |
| #2 1,565,115 | 87–92 | — | — | 8–13 | 3 Au, Pd | 283–330 |
| #3 4,797,328 | (1) 86–99 | 0–10 | — | 0–13 | 1–10 Ti, Zr | 700–950 |
|  | (2) — | 0–10 | — | 0–13 | 1–10 Ti, Zr 86–99 Pb | ... |
|  | (3) — | — | — | 1–6 | 1–10 Ti 86–93 Pb | ... |
|  | (4) — | 4–10 | — | — | 1–10 Ti 86–92 Pb | ... |
|  | (5) — | — | — | — | 1–10 Ti 90–99 Pb | ... |
| #4 3,607,253 | 89.4–95.1 | — | 1–5 | 3–3.8 | 0.7–1.3 Cd 0.2–0.5 Sb | 210 (?) |
| #5 3,157,473 | (1) — | 100 | — | — | — | 157 |
|  | (2) — | 97 | — | 3 | — | 144 |
|  | (3) 49.1 | 50.9 | — | — | — | 120 |
| #6 3,503,721 | 90–98 | — | — | 2–10 | — | 220 |

The '309 reference discloses a composition having antimony (Sb), which is essential to the functionality of the, alloy, but is toxic. The '115 reference discloses a composition with a melting temperature in the range of 283°–330° C., which is too high for general electronics packaging applications. Such environments generally require a melting point range of about 175°–220° C. The '328 reference discloses five compositions. All of those compositions have working temperatures in the range of 700°–950° C., which is prohibitively high for electronics packaging. Such alloys are primarily designed to bond ceramic articles. They contain Pb as their main constituent.

The '253 reference discloses cadmium (Cd) and Sb, which are essential for the functionality of the alloy, but are toxic. The '473 reference discloses three alloys. Each of them has a melting temperature which is too low for automotive electronics packaging applications. Such alloys may be useful for domestic products, however, which may be assembled with alloys having a lower operating temperature. The '721 reference discloses an alloy that was designed for dip soldering, which has limited applicability in the automotive electronics field. The current technology uses Pb-bearing solders, and Sn-Bi, which contains no lead but has a melting point of 138° C., and is unsuitable for electronic packages with high power dissipation.

Against this background, there remains an unsatisfied need for lead-free, non-toxic soldering alloys which have a fine, stable microstructure, and thereby exhibit enhanced resistance to creep and fatigue. Preferably, such alloys should exhibit a melting temperature in the range of 175°–230° C. so that they may be used in high power devices which dissipate heat. Particularly in the automotive electronics industry, there is a need for new alloys which are designed to be used as a replacement for the currently used Sn-Pb solders in thick film and printed wire board products so that no other changes in manufacturing facilities or processes are needed.

SUMMARY OF THE INVENTION

The alloy disclosed in this invention has the following composition (weight percent): 80% Sn, 5-14.5% In, 4.5-14.5% Bi and 0.5% Ag.

It is an object of the present invention to provide a non-toxic solder alloy which is suitable for use with thick film and printed wire board products.

It is also an object of the present invention to provide an alloy with a fine, stable microstructure which will thereby provide enhanced resistance to creep and fatigue, together with reliability.

It is additionally an object of the present invention to provide a solder alloy with a melting temperature in the range of 175°-220° C., which will render it suitable for use with components having a high power dissipation.

Furthermore, it is an object of the present invention to provide an alloy which has good wettability with thick film conductors for thick film modules and/or with Cu conductors or Sn covered Cu conductors for PWB's.

Moreover, it is an object of the present invention to provide ingredients which are relatively affordable and in reasonable supply.

Further, it is an object of the present invention to provide an alloy exhibiting favorable thermal and electrical conductivities and a satisfactory coefficient of thermal expansion.

DETAILED DESCRIPTION OF PREFERRED EMBODIMENTS

The alloys disclosed in this invention has the following composition (weight percent): 80% Sn, 5-14.5% In, 4.5-14.5% Bi and 0.5% Ag.

Metallurgical examination using metallography and electron microscopy has shown that the alloys have a very fine microstructure. The microstructure of the preferred alloy consists of an Sn matrix (with dissolved In Bi and Ag), with finely dispersed intermetallic particles of $InSn_4$ (with dissolved Bi) and BiIn (with dissolved Sn). Such a microstructure enhances fatigue/creep resistance and is essential for the reliability of solder interconnects. The inclusion of In is also helpful for enhancing the fatigue/creep resistance via grain growth control. It is thought that the intermetallic particles impede grain growth and retard grain coarsening.

By Differential Scanning Calorimetry (DSC) analysis, the melting temperature of this alloy has been found to be 179°-201° C. This melting temperature range is suitable for use in thick film products as well as printed wire boards, which are prevalent electronic components.

Another important feature of this alloy is that its microstructure is very stable. After thermal aging at 150° C. for 48 hours, little coarsening was observed. This is essential for long term reliability of the solder interconnect.

These unique characteristics make the new alloy a suitable replacement for the currently used Sn-Pb solders for automotive electronics packaging applications with enhanced reliability. Such characteristics are not exhibited by any conventional alloys.

Criteria and Alloy System Selection

The preferred alloy was selected from 8 alloys which have been developed. Based on a literature search, past experience, and analysis of existing solder alloys and potential solder alloy elements, it has been recognized that the following criteria should be considered in selecting the preferred composition:

(1) Toxicity. Cadmium (Cd), and thallium (Tl) are known to be toxic and should not be considered. Toxicological data indicate that Sb is also toxic. Although this has not been widely recognized by the industry, the inventors believe that this element should not be considered for future alloy development. They have also concluded that Sn, In, Bi, Ag, and Cu may be suitable for future use.

(2) Melting Temperatures. The desired melting temperature of the preferred alloy is determined by its intended applications. The operating and environmental temperature of an electronic module determines the lower limit, while the upper limit is determined by the thermal stability/endurance of the substrate and components. Flux activation is also a consideration. For automotive electronics packaging applications, the inventors have concluded that melting points in the range 175°-220° C. are desirable.

(3) Cost and Availability. Sn, In, Bi, Ag, and Cu, for use in a high Sn alloy, are relatively affordable and in reasonable supply for the intended applications.

(4) Wettability. The alloy should have good wettability with thick film conductors for hybrids and/or with Cu conductors for printed wire boards.

(5) Reliability. This criterion covers mechanical properties, fatigue life, thermal stability, electromigration potential, and substrate/component compatibility.

(6) Physical/Chemical Properties. These include favorable thermal and electrical conductivities, coefficient of thermal expansion, and grain structure.

Based on these criteria, two candidate alloy systems were selected and were developed: Sn-Bi-Ag, and Sn-In-Bi-Ag. Sn-Sb-Ag alloys were made initially, but the work was discontinued due to concerns over the toxicity of Sb.

Alloy Fabrication

High purity metals were purchased as starting materials. These included: 99.99+% Sn shots, 99.9% Bi powders (−325 mesh), 99.99+% In shots, and 99.99% Ag wire. These ingredients were mixed in pre-determined proportions. Alumina crucibles were used. The ingredients were melted in a tube furnace under a flowing $H_2$ atmosphere (99.99% pre-purified) to prevent oxidation. The alloy was kept in a molten state for several hours for homogenization. Furnace temperature was measured with thermocouples and recorded with a chart recorder. Average heating rate was about 48° C./minute. The cooling rate was about 2.5°-3.0° C./minute on average over the 100° C.-500° C. range.

Alloy Analyses (1) Chemical Analysis

The starting compositions of the eight alloys designated below were:

| Alloy Sample No. | Elements | Proportions |
|---|---|---|
| #2 | Sn—Sb—Ag | 96/2/2 |
| #3 | Sn—Sb—Ag | 88/10/2 |
| #4 | Sn—In—Bi—Ag | 90/5/4.5/0.5 |
| #5 | Sn—In—Bi—Ag | 80/10/9.5/0.5 |
| #6 | Sn—In—Bi—Ag | 80/14.5/5/0.5 |
| #7 | Sn—In—Bi—Ag | 80/5/14.5/0.5 |
| #8 | Sn—In—Ag | 90/5/5 |

-continued

| Alloy Sample No. | Elements | Proportions |
| --- | --- | --- |
| #9 | Sn—Bi—Ag | 90/5/5 |

Samples were taken from each alloy ingot and submitted for chemical analysis. Results indicate that the final alloy composition is close to the starting composition.

(2) Differential Scanning Calorimetry (DSC) Analysis

Samples were taken from the alloy ingots for DSC analysis. The analysis was performed using a DuPont DSC 2910 system under a flowing $N_2$ atmosphere at a given heating rate. The onset and end temperatures of the melting peak (endothermic) for the heating cycle were taken from the DSC curves. Aluminum sample pans were used. Graphite sample pans can be used for high temperature analysis. The heating rate was 3° K./minutes. The results are summarized as follows.

| Sample: | #2 | #3 | #4 | #5 | #6 | #7 | #8 | #9 |
| --- | --- | --- | --- | --- | --- | --- | --- | --- |
| Melting Point (°C.): | | | | | | | | |
| Onset | 222 | 227 | 205 | 179 | 179 | 179 | 210 | 211 |
| End | 231 | 240 | 215 | 201 | 200 | 207 | 215 | 218 |

(3) Microstructural Analysis

Microstructural analysis was performed using chemical etching/optical microscopy, SEM microprobe, and X-ray diffraction (XRD). Suitable etchants for the disclosed alloys include a solution of methanol (100 ml) and hydrochloric acid (1 ml) for 10 seconds.

By analyzing these results, using knowledge of the thermodynamics of these alloy systems, the inventors made the following observations regarding certain of the alloy microstructures:

| Alloy Sample No. | Observation |
| --- | --- |
| #4 | Sn matrix (with dissolved In, Bi, Ag), with intermetallic particles of $Ag_3In$ (with dissolved Sn). |
| #5 | Sn matrix (with dissolved In, Bi, Ag), with intermetallic particles of $InSn_4$ (with dissolved Bi) an BiIn (with dissolved Sn). |
| #6 | Sn matrix (with dissolved In, Bi) (faceted cellular structure) with intermetallic particles of BiIn (with dissolved Sn) and $InSn_4$ (with dissolved Bi, Ag). |
| #7 | Sn matrix (with dissolved In, Bi) (dendritic), with Bi particles (with dissolved In, 1 Sn, Ag), and BiIn intermetallics (with dissolved Sn). |
| #8 | Sn matrix (with dissolved In and Ag), with finely dispersed intermetallic particles of: (1) Ag—Sn (gamma) (with dissolved In); (2) Ag—In—Sn; and (3) $In_3Sn$(beta)/$InSn_4$(gamma) eutectic. |
| #9 | Sn matrix (with dissolved Bi, Ag), with Bi particles, and $Ag_3Sn$ intermetallic phases (with dissolved Bi). Divorced eutectic microstructure is present. |

It is to be noted that these microstructures, show very finely dispersed microstructures and exhibit high creep/fatigue resistance and long fatigue life. Noteworthy also is that In can improve the fatigue life of solder alloys.

(4) Thermal Aging

Samples were taken from each alloy ingot and vacuum sealed in a glass tube. Thermal aging was performed at 150° C. for 48 hours. Microstructure examinations reveal that no microstructural coarsening occurred. This is necessary for long term reliability.

(5) Hardness Testing

Specimens were taken from the alloy ingots, and micro-hardness testing was performed with a Leco Hardness Tester M-400. Five measurements were taken for each sample. The average Knoop Hardness Number (KHN) for each sample was calculated and is summarized as follows.

| Alloy Sample No. | #2 | #3 | #4 | #5 | #6 | #7 | #8 | #9 |
| --- | --- | --- | --- | --- | --- | --- | --- | --- |
| Hardness (KHN) | 15.5 | 22.8 | 20.7 | 23.5 | 23.9 | 24.7 | 16.0 | 26.6 |

Results indicate that the disclosed Pb-free solder alloys have attractive overall properties for automotive and other electronics packaging applications.

In particular, the alloys #8 (Sn-In-Ag) has a very fine microstructure and excellent fatigue resistance, which is essential to the reliability of solder interconnects. The melting temperature is also suitable for automotive electronics packaging applications.

Thus, the disclosed solder alloys (1) contain no toxic constituents such as lead (Pb), antimony (Sb), and cadmium (Cd); (2) form a very fine and stable micro-structure, which is essential for creep/fatigue resistance and reliability of solder interconnects; and (3) have a melting temperature of 179°–207° C., which is suitable for automotive electronics packaging. The solder alloy will be used as a replacement for Pb-Sn solders currently used in electronics packaging. Overall, the preferred alloys are numbers 5–7 and 4.

While the best mode for carrying out the invention has been described in detail, those familiar with the art to which this invention relates will recognize various alternative designs and embodiments for practicing the invention as defined by the following claims.

We claim:

1. A non-toxic alloy for soldering electronic components, comprising 80% Sn, 5–14.5% In, 4.5–14.5% Bi, and 0.5% Ag.

2. A non-toxic alloy for soldering electronic components comprising 80% Sn, 10% In, 9.5% Bi, and 0.5% Ag.

3. A non-toxic alloy for soldering electronic components, the alloy including 80% Sn, 5–14.5% In, 4.5–14.5% Bi, and 0.5% Ag, the alloy comprising grains having:

an Sn matrix including dissolved In, Bi, and Ag; and finely dispersed intermetallic particles of $InSn_4$ (with dissolved Bi) and BiIn with dissolved Sn.

4. The alloy of claim 1 having a melting temperature of between 179°–207° C.

5. The alloy of claim 2 having a melting temperature of between 179°–201° C.

6. The alloy of claim 3 having a melting temperature of between 179°–201° C.

7. The alloy of claim 1, also comprising a microstructure having fine grains which exhibit minimal coarsening after thermal aging, thereby exhibiting the characteristic of long term reliability of inter-connections formed by the alloy.

8. The alloy of claim 2, also comprising a microstructure having fine grains which exhibit minimal coarsening after thermal aging, thereby exhibiting the characteristic of long term reliability of inter-connections formed by the alloy.

9. The alloy of claim 3, wherein the grains do not substantially coarsen during thermal aging, the grains thereby imbuing the alloy with the characteristic of long term reliability.

10. The alloy of claim 1 having an average Knoop hardness number of 23-25.

11. The alloy of claim 2 having an average Knoop hardness number of 23-25.

12. The alloy of claim 3 having an average Knoop hardness number of 23-25.

13. A method for making a non-toxic alloy for soldering, the method comprising the steps of:

providing as ingredients high purity Sn, In, Bi, and Ag in the amounts of 80% Sn, 5-14.5 In, 4.5-14.5 Bi, and 0.5% Ag;

mixing the ingredients in pre-determined portions in a crucible;

melting the ingredients to form a molten alloy under an inert atmosphere to prevent oxidation;

maintaining the molten alloy in a molten state for several hours for homogenization; and cooling the molten alloy at a rate of about 2.5°-3° C./min. to form a stable, fine microstructure.

14. The method of claim 13, wherein the microstructure has a fine grain structure which includes an Sn matrix including dissolved In, Bi and Ag and finely dispersed intermetallic particles of BiIn; and intermetallic particles of BiIn with dissolved Sn and $InSn_4$ with dissolved Bi, thereby imbuing the alloy with the characteristic of resistance to creep and fatigue.

15. The method of claim 13, wherein the alloy has a melting point in the range of 179°-215° C.

16. The method of claim 13, wherein the molten alloy is cooled at a rate of about 2.5°-3.0° C./minute on average over a temperature range of 100° C.-500° C.

17. The method of claim 13, wherein the ingredients are heated at a rate of about 48° C./minute.

* * * * *